JULIUS EDMUND DOTCH, M. D., OF WASHINGTON, DISTRICT OF COLUMBIA.

Letters Patent No. 84,481, dated December 1, 1868.

IMPROVEMENT IN PRESERVING MEAT.

The Schedule referred to in these Letters Patent and making part of the same.

*To all whom it may concern:*

Be it known that I, JULIUS EDMUND DOTCH, M.D., of the city of Washington, District of Columbia, have invented a new Process for Preserving Meat; and I do hereby declare that the following is a full and exact description thereof.

The nature of my invention consists in introducing aldehyde, in the liquid or gaseous state, or mixtures of aldehyde in glycerine, phospho-glyceric acid, or acetate of soda, or simply phospho-glyceric acid, in the body of the killed animal, or parts thereof, or in introducing aldehyde vapors in the lungs of the living animal until death occurs.

To enable others skilled in the art to make and use my invention, I will proceed to describe it.

When I wish to prepare the whole body of the animal for preservation, I open its cervical artery, let the blood run out, and then introduce my antiseptic fluids by means of a force-pump. When, however, I wish to prepare only parts of the animal, I subject them to the pressure of my liquids, either in a cask, which has a small tube screwed tightly in its top, or in an apparatus, such as are used for the process of preserving wood, until the liquid has penetrated into the central parts of the animal tissue.

Though the preserving-fluids may be used in any proportion or strength, I prefer to use a fluid which holds but a small percentage of aldehyde in solution, whenever I use the same, as its object is simply to take up the small amount of oxygen contained in the blood and the water of the meat, and thus to remove one cause of putrefaction.

When a proper quantity of this "ether" is employed, (*vide* Schlossberger's *Lehrbuch der Organischen Chem.*, fourth edition, page 296,) it will, by the absorption of the oxygen, be transformed into acetic acid, which is itself an antiseptic, and the objectionable though exceedingly fragrant smell of the aldehyde will thus entirely disappear.

I have found that, in my method for preserving meat, none of its nutritive elements are lost, as is the case in salting. The meat also retains its appearance, and will taste like fresh meat, even after months. Again the phospho-glyceric acid is not only an antiseptic, but also a highly nutritive element, it being a secondary product of decomposition of the oleo-phosphoric acid, which is the chief ingredient of the fatty matter of the liver, the brain, and nerves, and probably, also, of the blood. Oleo-phosphoric acid has also been met with in the yolk of the egg. I therefore accomplish, in this invention, more than can justly be expected.

I cover the meat, when it is ready for packing, with paraffine or stearine, or both mixed, whenever such meat is intended to be kept for a long time, or to be transported for a great distance; and that I claim as new, to pack the meats in corn-meal, so as to more effectually prevent them from putrefaction.

What I claim as my invention, and desire to secure by Letters Patent, is—

The preserving of the body of animals, or parts thereof, by the use of aldehyde, in the gaseous or liquid state, or mixtures of aldehyde in glycerine and phospho-glyceric acid, or acetate of soda and glycerine, or simply phospho-glyceric acid.

JULIUS EDMUND DOTCH, M. D.

Witnesses:
WM. R. CLARK,
WM. T. CLARK.